(12) United States Patent
Onishi

(10) Patent No.: US 7,215,448 B2
(45) Date of Patent: May 8, 2007

(54) IMAGE READING APPARATUS

(75) Inventor: Hiroaki Onishi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 217 days.

(21) Appl. No.: 11/104,464

(22) Filed: Apr. 13, 2005

(65) Prior Publication Data
US 2005/0179965 A1 Aug. 18, 2005

Related U.S. Application Data

(62) Division of application No. 09/786,680, filed on Mar. 8, 2001, now Pat. No. 6,917,453.

(51) Int. Cl.
*H04N 1/04* (2006.01)
(52) U.S. Cl. ............... 358/483; 358/475; 358/482; 358/484; 250/208.1
(58) Field of Classification Search ............ 358/475, 358/483, 482, 484, 497, 494, 496, 474, 509, 358/505, 512–514, 473, 472; 382/312, 313, 382/318, 319; 250/208.1, 234–236; 399/211
See application file for complete search history.

(56) References Cited

U.S. PATENT DOCUMENTS

| | | | |
|---|---|---|---|
| 5,489,995 A | 2/1996 | Iso et al. ............ | 358/483 |
| 5,570,204 A | 10/1996 | Kumashiro ............ | 358/471 |
| 5,900,622 A | 5/1999 | Ogura et al. ............ | 250/208.1 |
| 5,905,583 A | 5/1999 | Kawai et al. ............ | 358/484 |
| 6,014,231 A | 1/2000 | Sawase et al. ............ | 358/482 |
| 6,147,339 A | 11/2000 | Matsumoto ............ | 250/208.1 |
| 6,448,995 B1 * | 9/2002 | Fujimoto et al. ............ | 347/241 |
| 6,496,285 B1 | 12/2002 | Fujimoto et al. ............ | 358/475 |
| 6,952,289 B1 * | 10/2005 | Fujimoto et al. ............ | 358/472 |
| 7,085,023 B2 * | 8/2006 | Okamoto et al. ............ | 358/471 |

FOREIGN PATENT DOCUMENTS

| | | |
|---|---|---|
| EP | 0 710 002 A | 5/1996 |
| JP | 5-88068 | 11/1993 |
| JP | 5-344276 | 12/1993 |
| JP | 6-276355 | 9/1994 |
| JP | 7-046374 | 2/1995 |
| JP | 7-203125 | 8/1995 |
| JP | 8-340419 | 12/1996 |
| JP | 9-200432 | 7/1997 |

OTHER PUBLICATIONS

Patent Abstracts of Japan vol. 1995, No. 05 Jun. 30, 1995 & JP 07 046374 a (Matsushita Electric Ind. Co Ltd), Feb. 14, 1995 *Abstract*.

* cited by examiner

*Primary Examiner*—Cheukfan Lee
(74) *Attorney, Agent, or Firm*—Michael Bednarek; Paul, Hastings, Janofsky & Walker LLP

(57) ABSTRACT

An image reading apparatus (A) includes a plurality of light sources (6) arranged in a row, and a hollow portion (14) for guiding light emitted from the light sources toward an image read line (S). The hollow portion (14) is divided by a plurality of partitions (15) into a plurality of individual sections (14a). As a result, it is possible to illuminate the longitudinally opposite ends and longitudinally central portion of the image read line (S) uniformly.

5 Claims, 10 Drawing Sheets

IMAGE READING APPARATUS

This application is a division of U.S. patent application Ser. No. 09/786,680, filed Mar. 8, 2001 now U.S. Pat. No. 6,917,453.

TECHNICAL FIELD

The present invention relates to an image reading apparatus used for reading images of various kinds of documents.

BACKGROUND ART

A typical prior art image reading apparatus has such a structure as shown in FIG. 11. The illustrated image reading apparatus comprises a substrate 92 provided with a plurality of light sources 91, a lens array 93, a plurality of light receiving elements 94 and a case 90 for housing these components. The case 90 has an upper surface on which a transparent plate 97 is mounted. The transparent plate 97 has an obverse surface a portion of which serves as an image read line Sa. As shown in FIG. 12, the light sources 91 are arranged in a row. The case 90 includes a hollow portion 96 for guiding light emitted from the light sources 91 toward the image read line Sa.

In this image reading apparatus, when light emitted from the light sources 91 impinges on the image read line Sa, the light is reflected by the document D. The reflected light is collected by the lenses of the lens array 93 to be received by the light receiving elements 94. Each of the light receiving elements 94 outputs signals corresponding to the received amount of light. Thus, an image of the document D is read by line by line.

In an image reading apparatus, an image read line Sa needs to be illuminated as uniformly as possible along its entire length for enhancing the image reading quality. However, the above-described prior art structure has a problem that the image read line Sa cannot be illuminated uniformly, as will be described below.

In the prior art, the hollow portion 96 simply extends along the row of light sources 91. Therefore, light emitted from the light sources 91 overlaps at a longitudinally central portion of the image read line Sa. On the other hand, light does not overlap at longitudinally opposite ends of the image read line Sa, because only a small number of light sources are arranged in facing relationship to these ends of the image read line. As a result, the longitudinally opposite ends of the image read line Sa are less illuminated than the longitudinally central portion.

Further, in the prior art structure, the case 90 is made of black resin so that all the surfaces defining the hollow portion 96 are black for absorbing light. This is because black surfaces prevent light from scattering upon reflecting near the light receiving elements 94, so that scattering reflection light will not enter the light receiving elements 94. In the prior art structure, therefore, light impinging on two surfaces 96a defining the longitudinally opposite ends of the hollow portion 96 is not reflected toward the image read line Sa. This also causes the longitudinally opposite ends of the image read line Sa to be less illuminated than the central portion.

Moreover, auxiliary elements (not shown) such as jumpers, capacitors, resistors and/or the like may be mounted on the obverse surface of the substrate 92. In such a case, the auxiliary elements may have light reflectivity which is different from that of the obverse surface of the substrate 92. On the other hand, all of light emitted from the light sources 91 does not directly reach the image read line Sa. Some of light is reflected at the obverse surface of the substrate 92 before reaching the image read line Sa. In the prior art structure, the auxiliary elements reflect light differently from the obverse surface of the substrate 92. As a result, portions of the image read line Sa corresponding to the auxiliary elements may be illuminated with different luminosity from the other portions of the image read line Sa.

DISCLOSURE OF THE INVENTION

It is an object of the present invention to provide an image reading apparatus which is capable of eliminating or reducing the problems of the above-described prior art apparatus.

In accordance with a first aspect of the present invention, there is provided an image reading apparatus comprising a substrate which has an obverse surface provided with a plurality of light sources arranged in a row, a case including a hollow portion extending along the row of the light sources for guiding light emitted from the light sources toward an image read line, and a lens array for forming an image of a document onto a plurality of light receiving elements arranged in a row. The document is disposed to face the image read line. The image reading apparatus further includes a plurality of partitions for dividing the hollow portion longitudinally into a plurality of individual sections.

With this structure, light emitted from the light sources travels within the individual sections before reaching the image read line. Therefore, unlike the prior art apparatus, the degree of light overlapping at a longitudinally central portion of the image read line does not differ much from that at the longitudinally opposite ends of the image read line. Therefore, the image read line can be illuminated longitudinally uniformly to enhance the image reading quality.

Preferably, the partitions may be integral with the case. With this structure, the partitions can be made easily. Further, since the partitions serve as ribs, the mechanical strength of the case is enhanced.

Preferably, the partitions may be arranged at a substantially constant pitch longitudinally of the hollow portion, and the light sources may be equally allocated to the individual sections. With this structure, the individual sections are identical with respect to their size and the amount of light emitted therein. Therefore, uniform illumination of the image read line over its entire length can be performed even more reliably.

Preferably, each of the partitions has light-reflective surfaces. With this structure, it is possible to prevent light from being absorbed by the partitions. Therefore, the amount of light directed toward the image read line can be prevented from being reduced.

Preferably, the partitions are white for enhancing the reflectivity of the partitions. Preferably, a plurality of surfaces defining the hollow portion as well as portions of the obverse surface of the substrate facing the hollow portion are also white. With this structure, light from the light sources can be efficiently reflected at these surfaces to be directed toward the image read line, so that the illumination efficiency can be enhanced.

Preferably, the case may be made of white resin. With this structure, even a case having a complicated shape can be easily made white.

Preferably, the plurality of light receiving elements may be disposed on the obverse surface of the substrate, and the image reading apparatus may further include a reflection preventing member surrounding the light receiving elements. With this structure, the light receiving elements can be mounted on the obverse surface of the substrate like the light sources, so that mounting can be performed easily. Further, light traveling from the document toward the light receiving elements can be prevented from randomly reflecting near the light receiving elements. Therefore, the light receiving elements do not receive noises due to the randomly reflecting light, which leads to enhancement of image reading quality. Preferably, each of the light sources may be confronted by a surface for blocking light emitted from the light source. With this structure, it is possible to prevent light traveling toward the front of the light sources from directly reaching the image read line. Therefore, it is possible to prevent the image read line from being illuminated more intensively at portions confronting the light sources than at the other portions. As a result, uniform illumination of the image read line can be performed even more reliably.

Preferably, the obverse surface of the substrate may be provided with auxiliary elements, and at least selected ones of the partitions cover the auxiliary elements. With this structure, light emitted from the light sources can be prevented from reaching the auxiliary elements. Therefore, even if the auxiliary elements have light reflectivity which is largely different from that of the substrate, it is possible to prevent the illumination intensity of the image read line from largely differing between portions corresponding to the auxiliary members and the other portions.

Preferably, each of the auxiliary elements projects from the obverse surface of the substrate, and each selected partition is formed, at a portion covering the auxiliary element, with a recess for receiving the auxiliary element. With this structure, the auxiliary element can be appropriately covered by the corresponding partition. Moreover, it is possible to bring the partitions into engagement with the obverse surface of the substrate while also preventing the partitions from undesirably interfering with the auxiliary elements. Therefore, the substrate can be positionally adjusted by referring to the positions of the partitions.

Preferably, the case may include a groove for receiving the lens array, and the case may be provided with a transparent plate which has an obverse surface providing the image read line. The transparent plate may have a reverse surface formed with a projection for engagement with the lens array for forcing the lens array toward a bottom of the groove. With this structure, the transparent plate for providing the image read line can be utilized for fixing the lens array.

Preferably, the lens array may comprise a plurality of lenses arranged in a row and held in an elongated holder while the projection may extend longitudinally of the holder for engagement therewith. With this structure, the projection presses down the lens array along its length. Therefore, it is possible to prevent the lens array from warping longitudinally. As a result, the distance between the lenses of the lens array and the light receiving elements can be kept unchanged, which prevents the read image from becoming out-of-focus.

Preferably, the case may be formed with an opening in which the transparent plate is fitted, and the transparent plate and side walls defining the opening may be respectively provided with at least one pair of engagement means for preventing the transparent plate from moving far away from the lens array. With this structure, it is possible to facilitate mounting of the transparent plate to the case.

In accordance with a second aspect of the present invention, there is provided an image reading apparatus comprising a substrate which has an obverse surface provided with a plurality of light sources arranged in a row, a case including a hollow portion extending along the row of the light sources for guiding light emitted from the light sources toward an image read line, and a lens array for forming an image of a document onto a plurality of light receiving elements arranged in a row, the document being disposed to face the image read line. The image reading apparatus includes a pair of wall surfaces defining longitudinally opposite ends of the hollow portion, and at least part of each wall surface is a light-reflective surface.

With this structure, when the light traveling toward the longitudinally opposite ends of the hollow portion reaches the light reflective surfaces, the light is reflected toward the image read line. At this time, most of the light thus reflected travels toward the longitudinally opposite ends of the image read line. Therefore, it is possible to prevent the longitudinally opposite ends of the image read line from being less illuminated than a longitudinally central portion of the image read line. Accordingly, it is possible to illuminate the image read line uniformly, thereby enhancing the image reading quality.

Preferably, the light reflective surface may be white. With this structure, the reflectivity of the light reflective surfaces can be enhanced.

Preferably, the hollow portion may provide a space between the image read line and the lens array, and the light reflective surface may be oriented into the space. With this structure, it is possible to position the light reflective surfaces close to the longitudinally opposite ends of the image read line. This is preferable for reliably illuminating the longitudinally opposite ends of the image read line.

Preferably, a complementary member which is separate from the case may be mounted in the case. The complementary member has outer surfaces which are at least partially white, and part of the complementary member serves as the light reflective surface. With this structure, the complementary member is utilized for readily providing the light reflective surface at an appropriate position within the case without complicating the configuration of the case.

Preferably, the case may include a groove for receiving the lens array, and part of the complementary member may be disposed between the lens array and the image read line to prevent the lens array from coming out of the groove. With this structure, it is possible to fix the lens array appropriately and reliably without increasing the number of parts of the image reading apparatus.

Other features and advantages of the present invention will become clearer from the detailed description given below with reference to the accompanying drawings.

BEST MONDE FOR CARRYING OUT THE INVENTION

Figure 1:
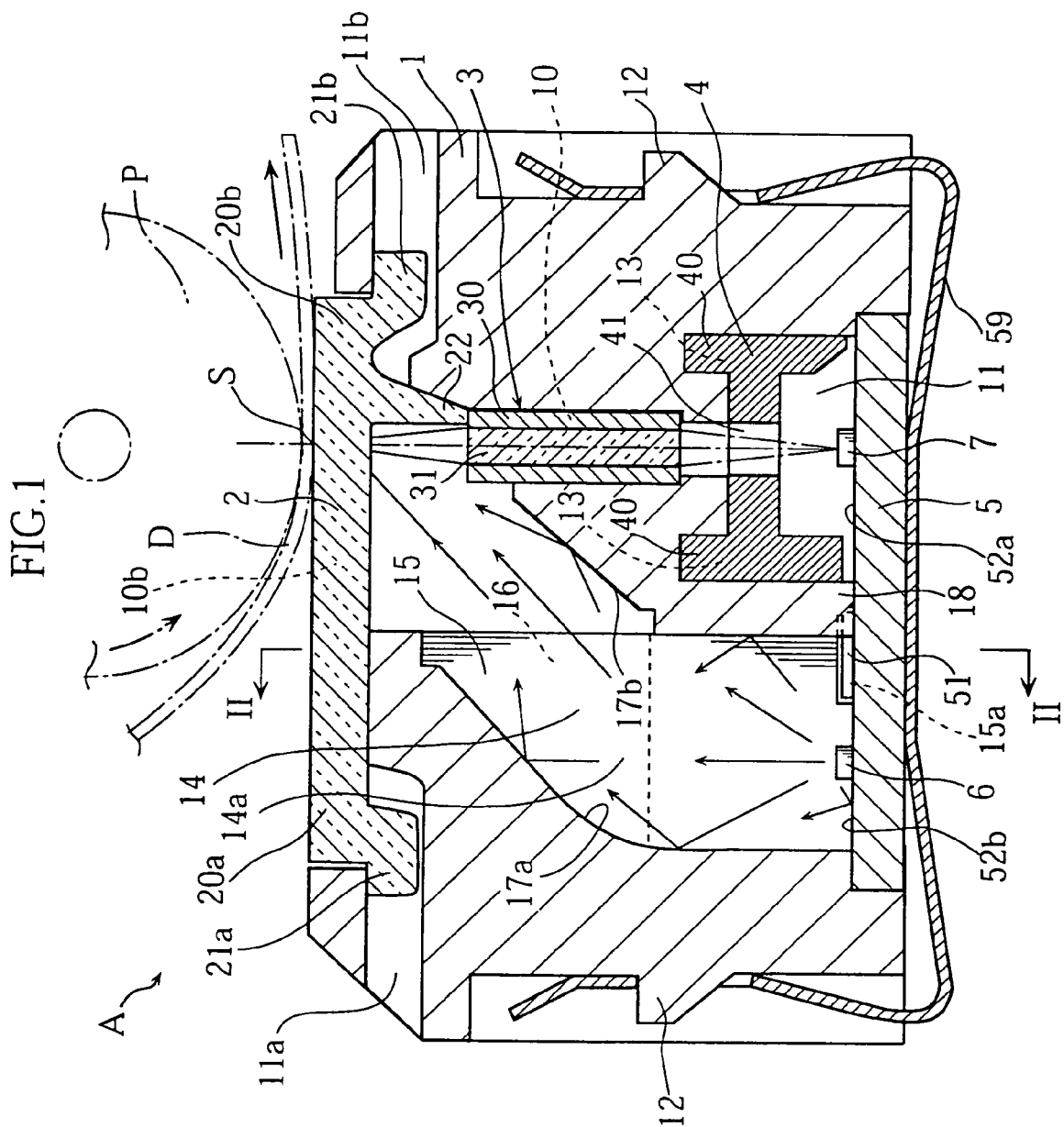
FIG. 1 is a sectional view showing an example of image reading apparatus in accordance with the present invention.

Preferred embodiments of the present invention will be described below with reference to the accompanying drawings. FIGS. 1 through 5 illustrate a first embodiment of the present invention. As shown in FIG. 1, an image reading apparatus A in this embodiment comprises a case 1, a transparent plate 2, a lens array 3, a reflection preventing member 4, a substrate 5, a plurality of LED chips 6, a plurality of light receiving elements 7 and a plurality of attachments 59.

Figure 5:
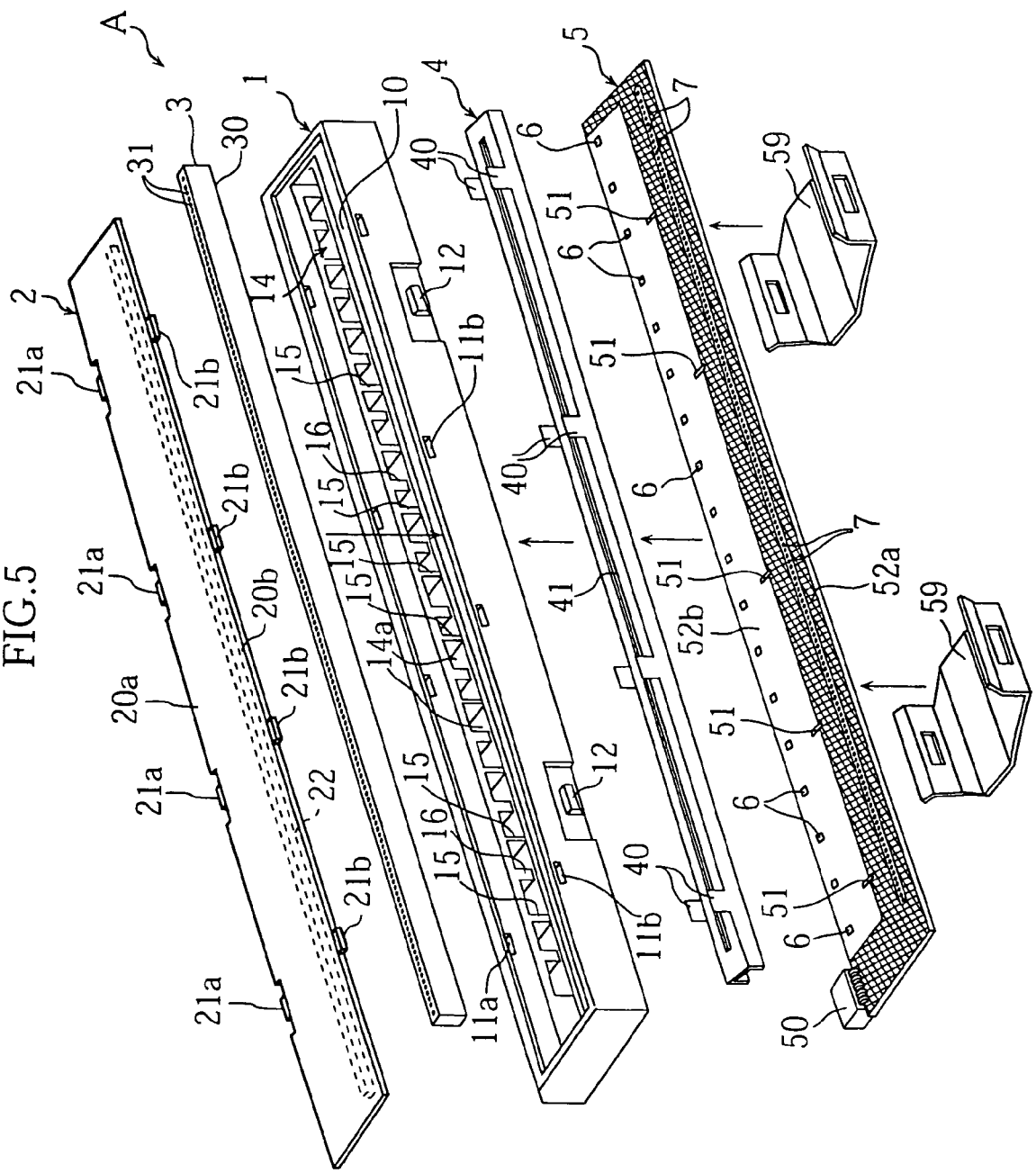
FIG. 5 is an exploded perspective view of the image reading apparatus shown in FIG. 1.

The case 1 is elongated as shown in FIG. 5. The case 1 may be made of white synthetic resin prepared by adding titanium oxide to polycarbonate for example. Therefore, all surfaces of the case 1 are white. Thus, the case 1 has a high light reflectivity of 90~98% for example.

The transparent plate 2, which may be made for example of acrylic synthetic resin having high transparency, is in the form of a generally elongated rectangle. The transparent plate 2 has an opposite pair of longitudinal edges 20a, 20b which are respectively formed with a plurality of engaging projections 21a, 21b arranged at a predetermined pitch longitudinally of the transparent plate 2. The transparent plate 2 has a reverse surface (lower surface) formed with an elongated projection 22 extending longitudinally of the transparent plate 2.

As clearly shown in FIG. 1, the case 1 is formed, on its upper surface, with an opening 10b, which is closed by fitting the transparent plate 2 therein. The opening 10b is defined by side walls which are formed with a plurality of engaging holes 11a, 11b, respectively. The engaging projections 21a, 21b of the transparent plate 2 are inserted into the respective engaging holes 11a, 11b for engagement therewith. The transparent plate 2 is thus fixed to the case 1. In mounting the transparent plate 2 to the case 1, a force may be applied to an upper portion of the case 1 to elastically deform the case 1 for widening the opening 10b. This facilitates engagement of the engaging projections 21a, 21b with the respective engaging holes 11a, 11b.

A platen roller P is disposed in facing relationship to an obverse surface (upper surface) of the transparent plate 2. The platen roller P transfers a document D in contact with the obverse surface of the transparent plate 2.

The lens array 3 comprises a plurality of lenses 31 arranged in a row and held in a holder 30 which is in the form of an elongated block formed of synthetic resin. Each of the lenses 31 may be a selfoc lens capable of forming an actual size erect image of a document. However, the kind of the lenses 31 is not limitative, and use may be made of other lenses such as a convex lens. The lens array 3 is fitted into a groove 10 formed in the case 1 below the transparent cover 2. The projection 22 of the transparent cover 2 engages an upper surface of the lens array 3, forcing the lens array 3 downward almost over its entire length. As a result, the lens array 3 is prevented from being lifted. Since the projection 22 engages the upper surface of the lens array 3 at a longitudinal edge thereof, the lens array 3 is not covered with the projection 22. A portion of the transparent plate 2 directly above the lens array 3 serves as an image read line S.

Upon receiving light, the light receiving elements 7 for photo-electric conversion output signals (image signals) corresponding to the received amount of light. The light receiving elements 7 are arranged on an obverse surface of the substrate 5 in a row extending longitudinally of the substrate 5. The case 1 has a hollow chamber 11 at the bottom. The substrate 5 is mounted at the bottom of the case 1 so that the light receiving elements 7 on the substrate are accommodated within the hollow chamber 11 for receiving light passing through the lenses 31. Mounting of the substrate 5 at the bottom of the case 1 is performed using the attachments 59. Each of the attachments 59 engages corresponding one of projections 12 formed on outer surfaces of the case 1, thereby constantly forcing the reverse surface of the substrate 5 upwardly.

The reflection preventing member 4 may be made of black ABS resin for example, and the surfaces thereof have low light reflectivity. The reflection preventing member 4 is disposed in the hollow chamber 11 to surround the light receiving elements 7. The reflection preventing member 4 is formed with a slit 41 for allowing light passing through the lenses 31 to travel toward the light receiving elements 7. The reflection preventing member 4 is upwardly formed with a plurality of projections 40. Mounting of the reflection preventing member to the case 1 may be performed by fitting the projections 40 into recesses 13 formed at the upper portion of the hollow chamber 11. The LED chips 6, each serving as a light source, are arranged on the substrate 5 at a predetermined pitch in a row extending longitudinally of the substrate 5.

The substrate 5 may be made of ceramic material or glass epoxy resin for example. The obverse surface of the substrate 5 is formed with a wiring pattern (not shown) for power supply and signal input/output with respect to the LED chips 6 and the light receiving elements 7. As clearly shown in FIG. 5, the substrate 4 is provided with a connector 50. The LED chips 6 and the light receiving elements 7 are electrically connected to an external device via the connector 50 and the above-described wiring pattern.

The obverse surface of the substrate 5 is further provided with auxiliary elements such as jumpers 51. Each of the jumpers 51 electrically connects separated portions of the wiring pattern.

The obverse surface of the substrate 5 includes a black region 52a (crisscross-hatched portion in FIG. 5) and a white region 52b (non-hatched portion in FIG. 5). The jumpers 51 are black though crisscross hatching is not applied thereto in FIG. 5. The white region 52b is limited to a portion adjacent the LED chips 6, and the other portions of the obverse surface of the substrate 5 provide the black region 52a. Thus, the black region 52a includes portions of the obverse surface of the substrate 5 facing the hollow chamber 11 shown in FIG. 1.

The case 1 is further formed with a hollow portion 14, a plurality of partitions 15 and a plurality of projecting walls 16. The hollow portion 14 extends from the bottom to the top of the case 1 and is elongated longitudinally of the case 1. The hollow portion 14 is upwardly closed by the transparent plate 2 and downwardly closed by the substrate 5. The hollow portion 14 is provided to guide light emitted from the LED chips 6 toward the image read line S. Therefore, the LED chips 6 are disposed at the bottom of the hollow portion 14. The hollow portion 14 is defined by two longitudinally extending walls 17a, 17b and two longitudinally opposite end walls 17c, 17d. All of the walls 17a~17d are white, thereby having high light reflectivity. The walls 17a, 17b are inclined partially or entirely for appropriately guiding light from the LED chips 6 toward the image read line S. The hollow portion 14 is positioned on the white region 52b of the substrate 5.

The partitions 15 are integrally formed on the case 1. Therefore, all surfaces of the partitions 15 are white. The partitions 15, each comprising a plate extending from the wall 17a widthwise of the hollow portion 14, are arranged at a predetermined pitch longitudinally of the hollow portion 14. Thus, the partitions 15 divide the hollow portion 14 beside and above the LED chips 6 into a plurality of individual sections 14a, as clearly shown in FIG. 2. The individual sections 14a are substantially equal in width L (the dimension longitudinally of the hollow portion 14). The partitions 15 are so provided that a single LED chip 6 is arranged centrally in each of the individual sections 14a.

Figure 2:
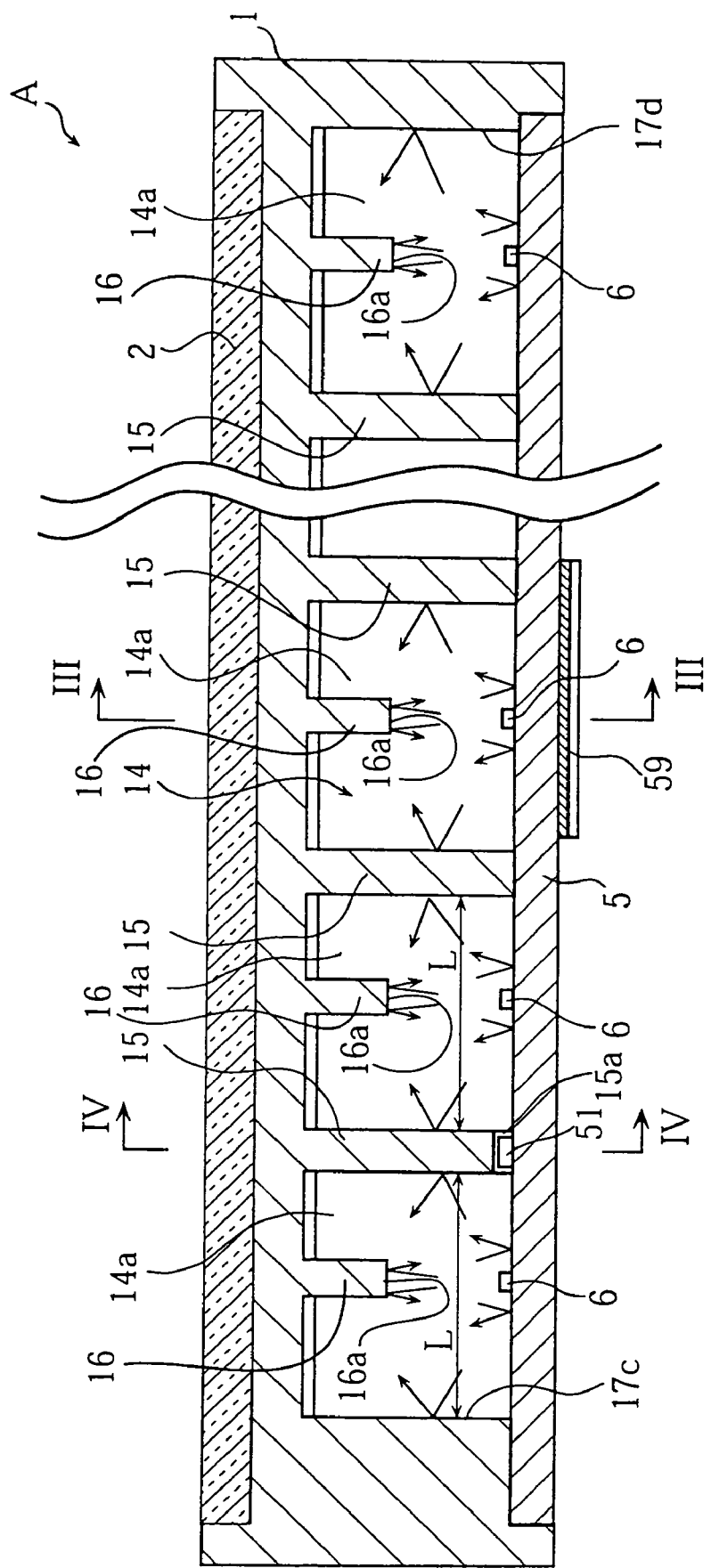
FIG. 2 is a sectional view taken along lines II—II in FIG. 1.
Figure 3:
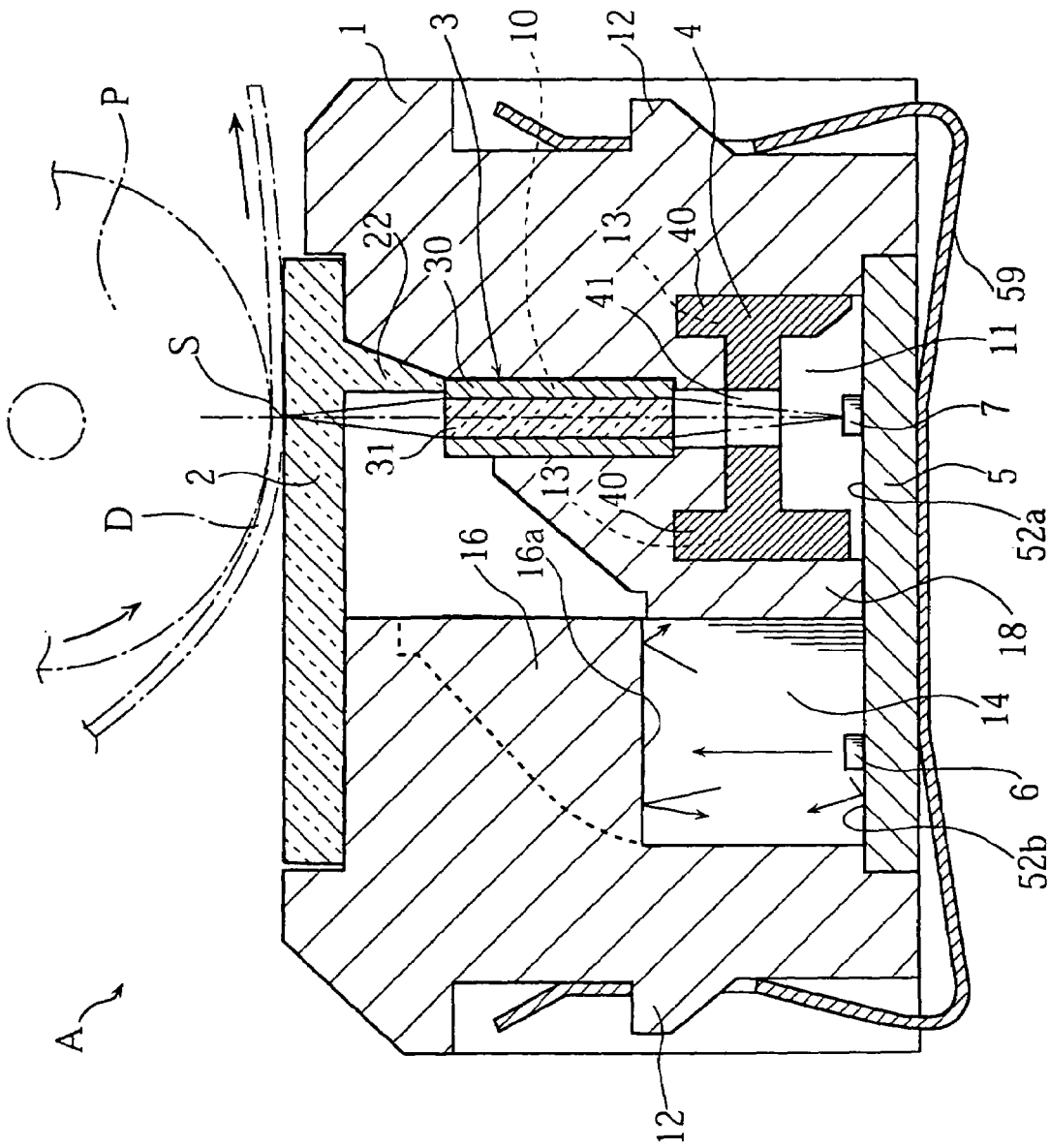
FIG. 3 is a sectional view taken along lines III—III in FIG. 2.
Figure 4:
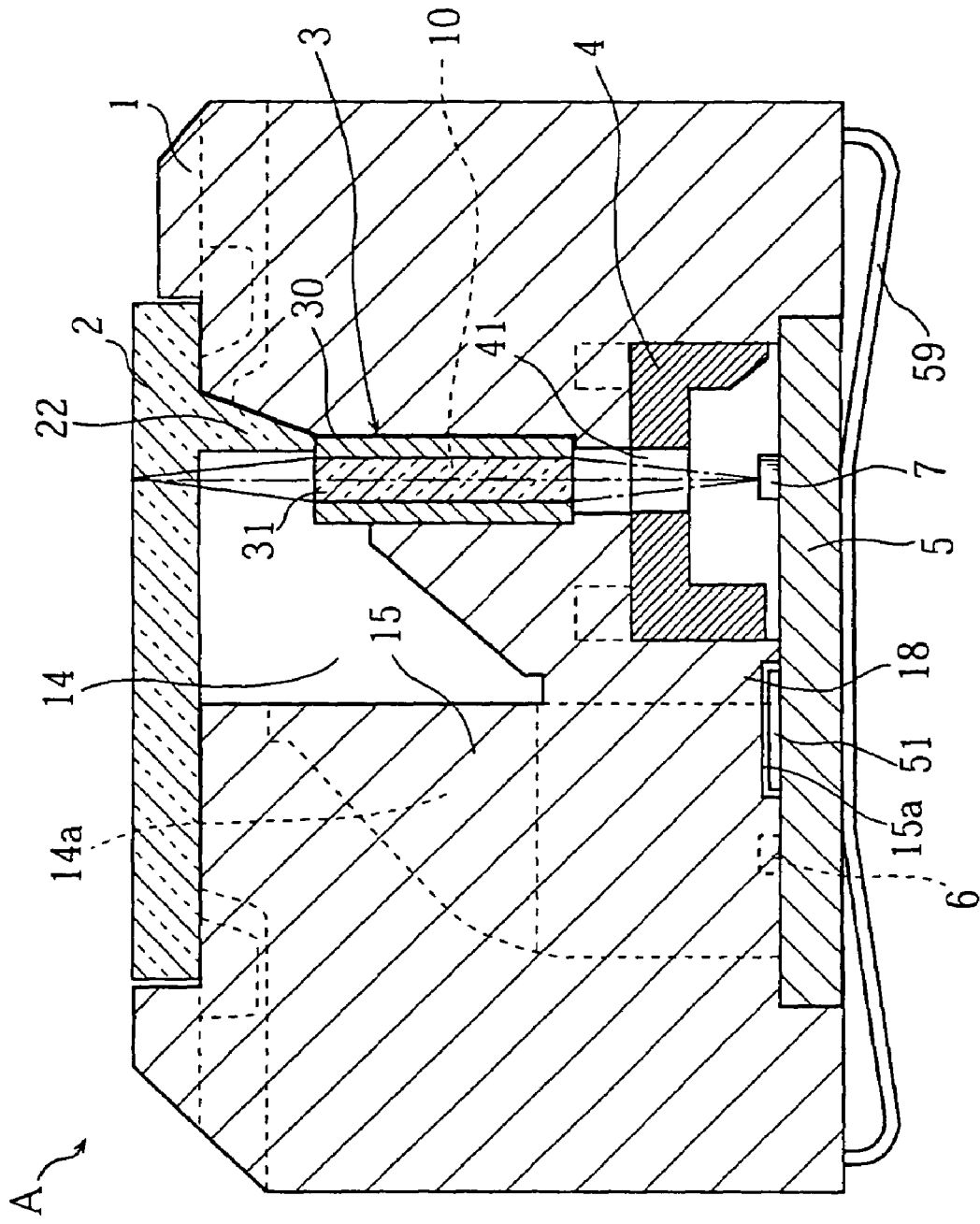
FIG. 4 is a sectional view taken along lines IV—IV in FIG. 2.

All or selected ones of the partitions 15 cover the jumpers 51. Specifically, the hollow chamber 11 and the hollow portion 14 are separated by a wall 18. Each of the jumpers 51 extends beneath the wall 18 into the hollow portion 14, as clearly shown in FIG. 1. As shown in FIGS. 2 and 4, the portion of the jumper 51 extended into the hollow portion 14 is covered with a corresponding one of the partitions 15. Each of the partitions 15 covering the jumper 51 is formed, at its lower portion, with a recess 15a for receiving the jumper 51. The recess 15a extends from the partition 15 into the wall 18. However, in the case where the entirety of the jumper 51 is covered by the partition 15 only, the recess 15a need not extend into the wall 18. In the present invention, other auxiliary elements such as capacitors, resistors or amplifiers may be mounted on the substrate 5 instead of the jumpers 51. Such auxiliary elements may also be covered with the partitions 15.

Similarly to the partitions 15, the projecting walls 16 are integrally formed on the case 1 so as to project from the wall 17a. The provision of the projecting walls 16 and the partitions 15 enhances the mechanical strength of the case 1. The surfaces of the projecting walls 16 are also white. As shown in FIG. 2, the projecting walls 16, each in the form of a plate, are shorter than the partitions 15. Each of the projecting walls 16 has a lower end surface 16a which faces a corresponding one of the LED chips 6 as appropriately spaced therefrom.

Next, the operation of the image reading apparatus A will be described.

Referring first to FIG. 1, light emitted from the LED chips 6 travels through the hollow portion 14 toward the image read line S. At this time, some of light travels directly toward the image read line S, whereas some of light is reflected by the walls 17a~17d, the partitions 15 and the projecting walls 16, or on the white regions 51b of the substrate 5 while traveling toward the image read line S. Since all the surfaces of these portions have high light reflectivity, light is not absorbed by these surfaces. As a result, it is possible to illuminate the image read line S efficiently.

On the other hand, light emitted from the LED chips 6 are divided by the individual sections 14a while traveling toward the image read line S. The individual sections 14a are identical with respect to their size as well as with respect to the number and position of the LED chips accommodated therein. Further, the jumpers 51 having black surfaces are not exposed in the individual sections 14a. Therefore, the light emission and reflection occurs similarly in all the individual sections 14a, so that it is possible to illuminate the image read line S uniformly over its entire length. Moreover, light traveling directly above the LED chips 6 is blocked by the lower end surfaces 16a of the projecting walls 16 so as not to directly reach the image read line S. Therefore, it is possible to prevent the image read line S from being illuminated more intensively at portions corresponding to the LED chips than at other portions. As a result, uniform illumination of the image read line S can be performed even more reliably.

The light reaching the image read line S is reflected on a surface of a document D disposed on the transparent plate 2. The reflected light passes through the lenses 31 of the lens array 3 to be received by the light receiving elements 7. Since the light receiving elements 7 are covered with the reflection preventing member 4, light is prevented from scattering and reflecting around the light receiving elements 7. Thus, the image reading apparatus A provides high image reading quality by the synergistic effect of preventing scattering light from entering the light receiving elements 7, uniformly illuminating the image read line S and enhancing illumination efficiency of the document D.

The number of the partitions 15 and the pitch between adjacent partitions 15 are not limitative for the present invention. Further, the light sources are not limited in number to one for each of the individual sections 14a. Moreover, the partitions 15 may be provided separately from the case 1. For example, a member provided with partitions 15 may be built in the case 1. The partitions 15 may not be white. Similarly, the case 1 may have a color other than white and may be black for example. The case 1 may be made of black resin, and the partitions 15 and other selected portions may be made white by painting.

FIGS. 6 through 10 illustrate a second embodiment of the present invention. In these figures, the elements which are identical or similar to those of the first embodiment are designated by the same reference signs as those used for the first embodiment.

Figure 6:
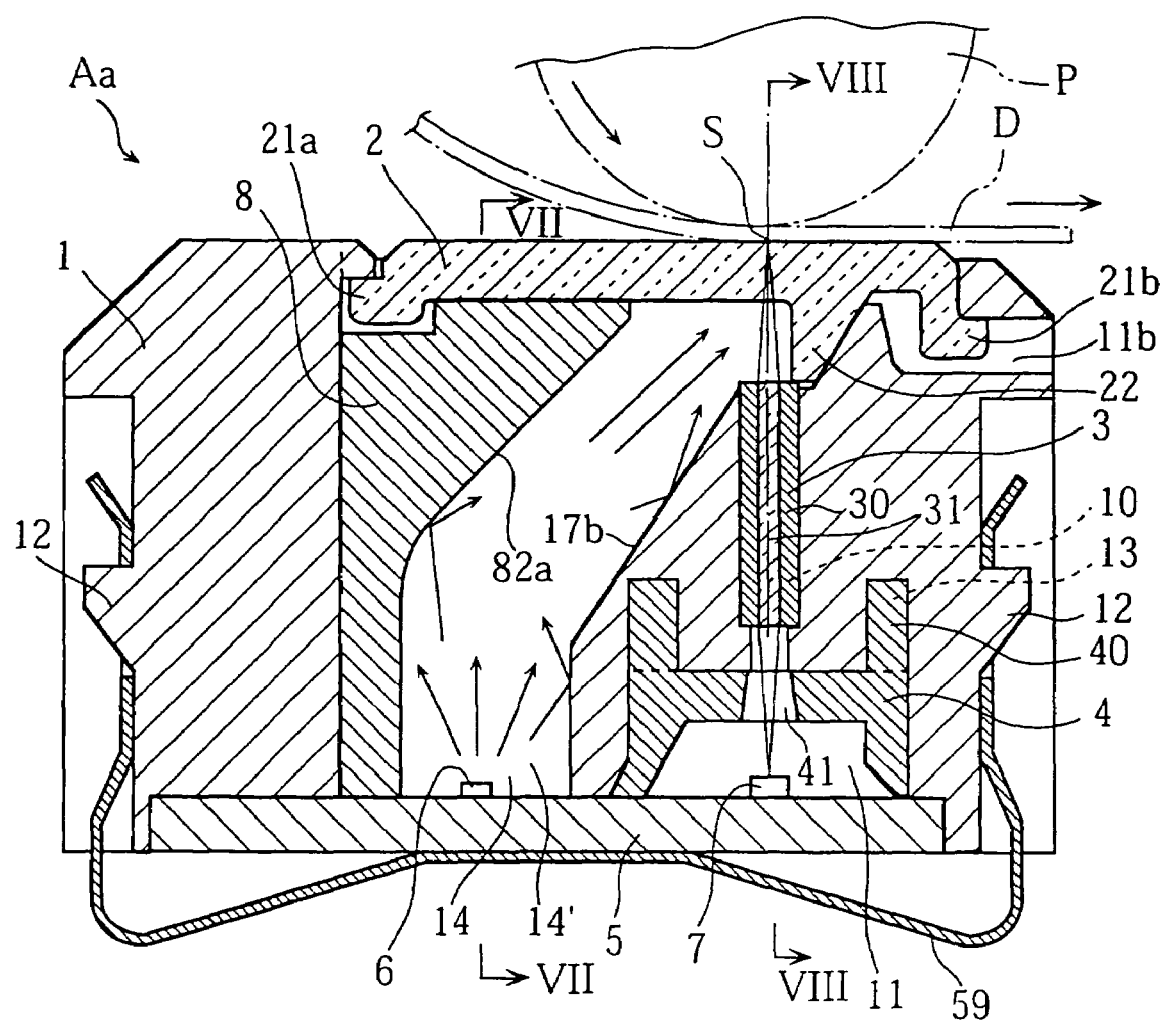
FIG. 6 is a sectional view showing another example of image reading apparatus in accordance with the present invention.
Figure 9:
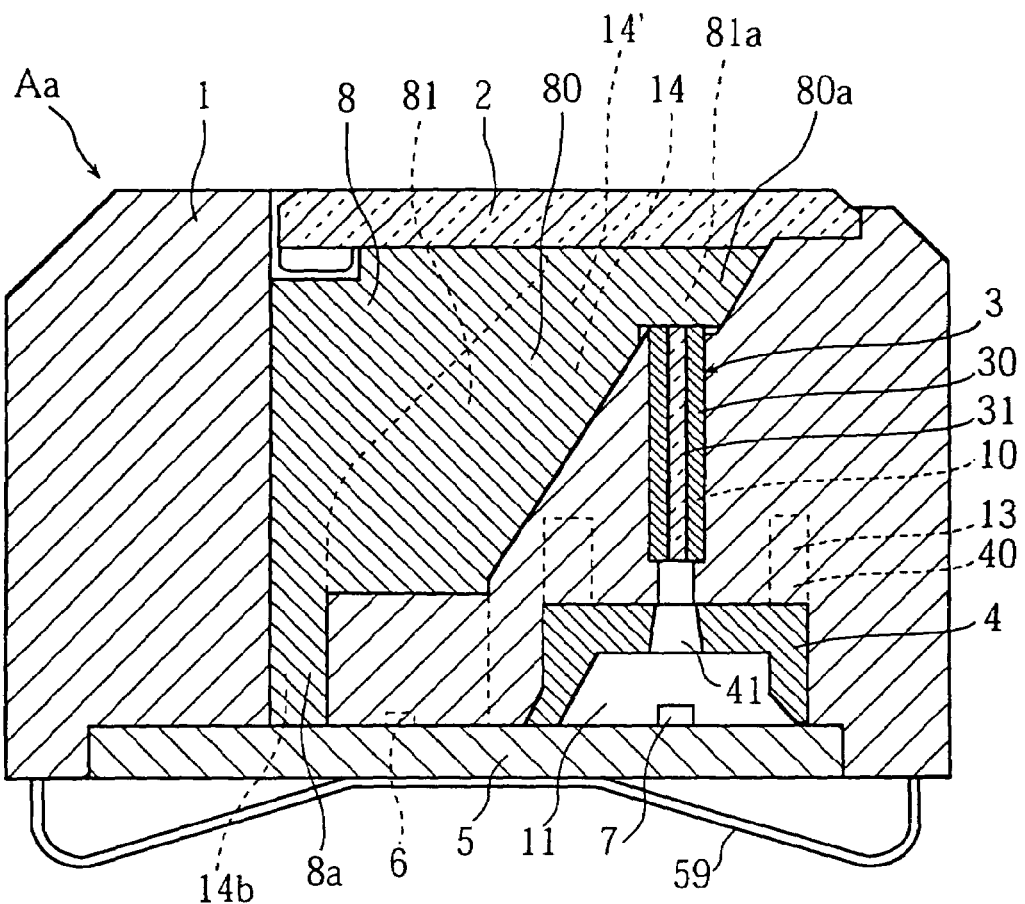
FIG. 9 is a sectional view taken along lines IX—IX in FIG. 8.
Figure 10:
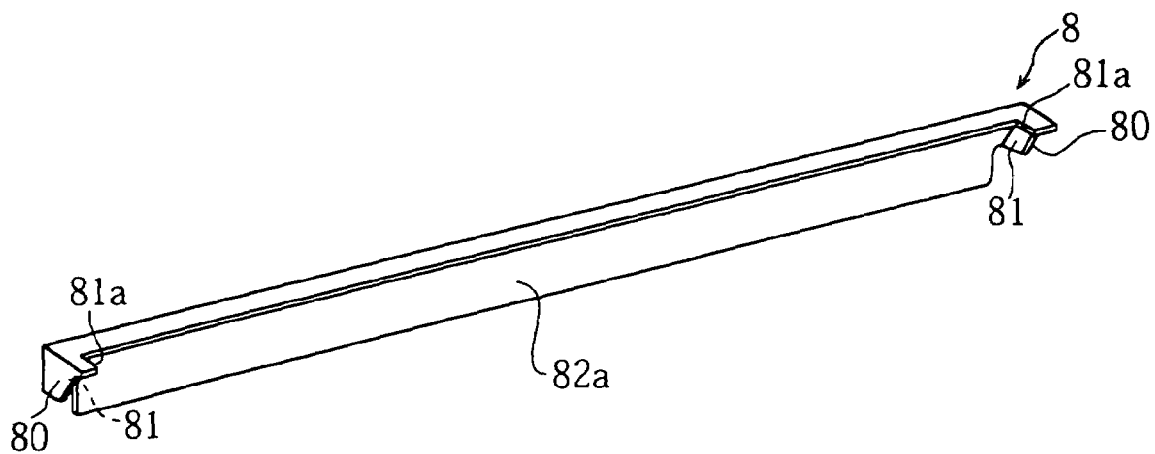
FIG. 10 is a perspective view of a complementary member used in the image reading apparatus shown in FIGS. 6 through 9.
Figure 11:
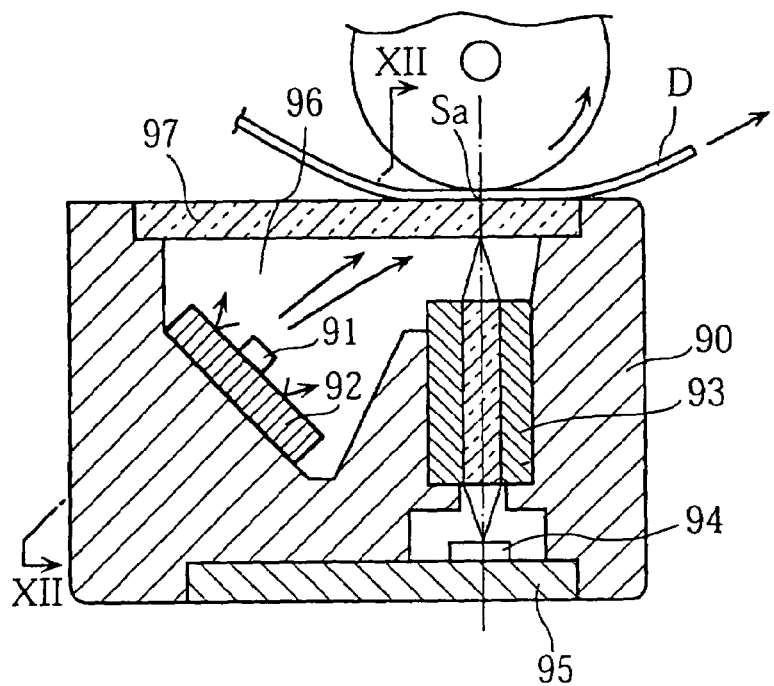
FIG. 11 is a sectional view showing a prior art apparatus.
Figure 12:
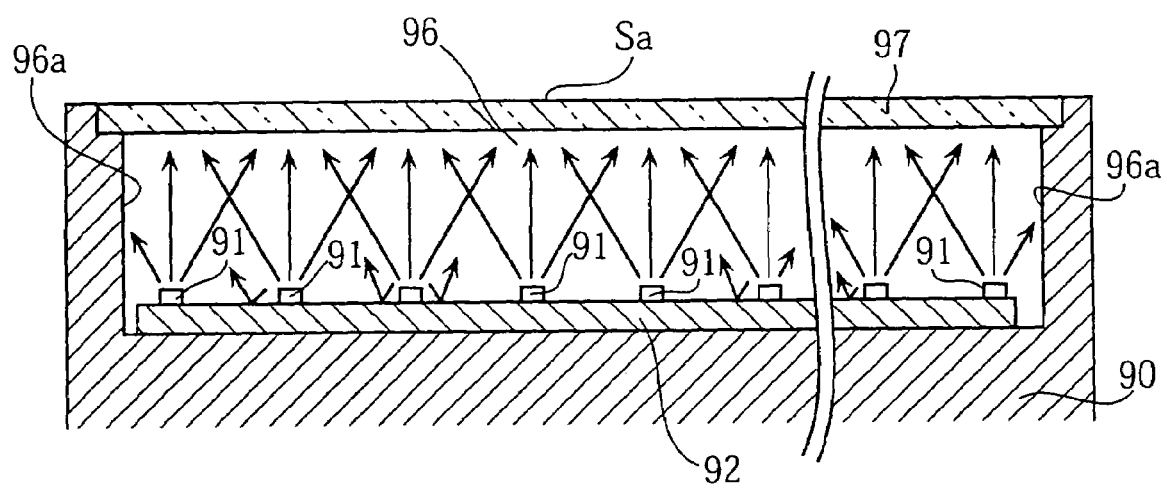
FIG. 12 is a sectional view taken along lines XII—XII in FIG. 11.

As clearly shown in FIG. 6, an image reading apparatus Aa in this embodiment includes a case 1 formed with a hole 14' which incorporates a complementary member 8. As shown in FIG. 10, the complementary member 8 includes a longitudinal side wall 82a. The side wall 82a is provided with a pair of longitudinally opposite end walls 80 extending transversely from the side wall 82a. Each of the end walls 80 includes light reflective surfaces 81, 81a having high light reflectivity. Similarly to the case 1, the complementary member 8 is made of white synthetic resin prepared by adding titanium oxide to polycarbonate for example, so that the surfaces of the complementary member 8 other than the light reflective surfaces 81, 81a also reflect light. As clearly shown in FIG. 9, a lower portion 8a of the complementary member 8 fits, at its longitudinally opposite ends, into a narrower portion 14b provided at longitudinally opposite ends of the hole 14', thereby positioning the complementary member relative to the case 1.

Figure 7:
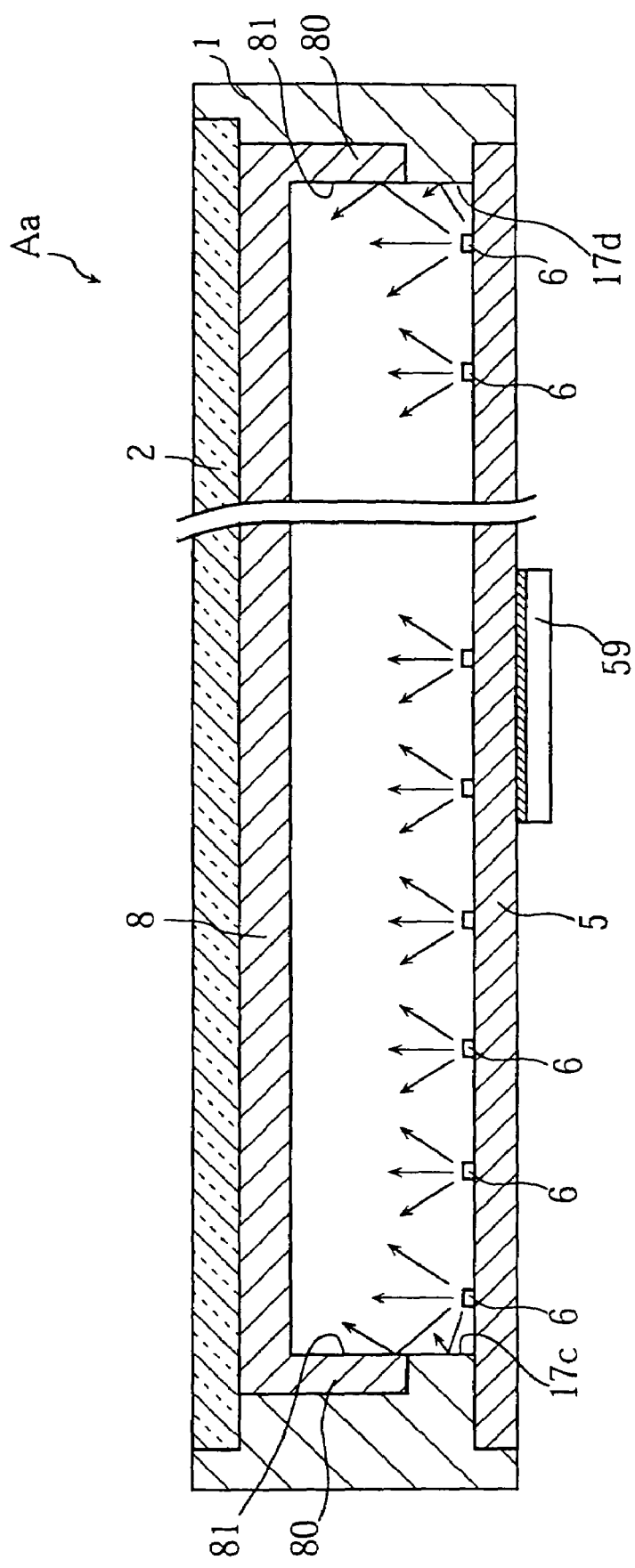
FIG. 7 is a sectional view taken along lines VII—VII in FIG. 6.
Figure 8:
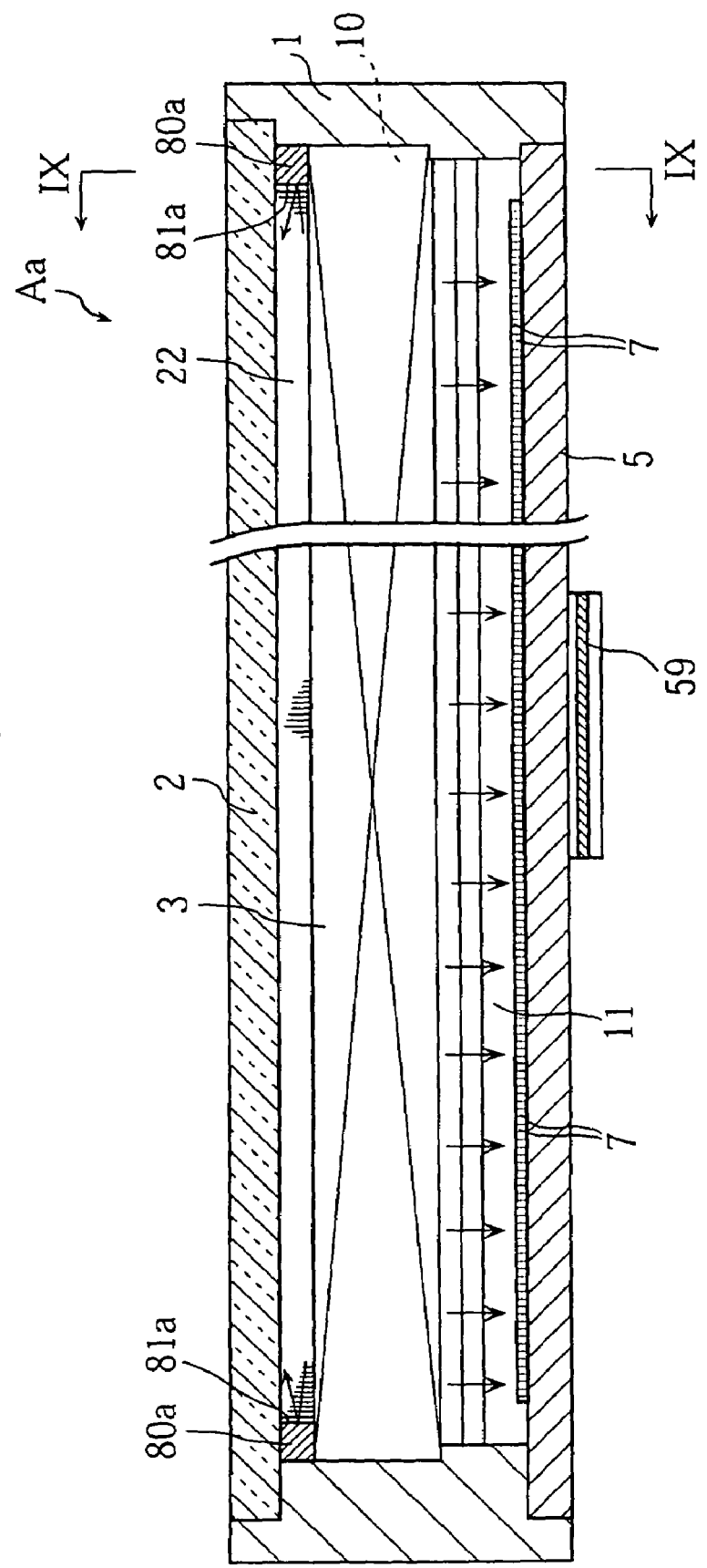
FIG. 8 is a sectional view taken along lines VIII—VIII in FIG. 6.

In this image reading apparatus Aa, a hollow portion 14 for guiding light is defined in the hole 14' of the case 1 between the side wall 82a of the complementary member 8 and an opposite wall 17b of the case 1, as shown in FIG. 6. The side wall 82a and the wall 17b are inclined partially or entirely for appropriately guiding light from a plurality of LED chips 6 toward an image read line S. The hollow portion 14 provides a space between the upper surface of a lens array 3 and the lower surface of a transparent plate 2. As clearly shown in FIG. 7, the light reflective surfaces 81 of the end walls 80 of the complementary member 8 are substantially flush with the walls 17c, 17d of the case 1, respectively, thereby defining longitudinally opposite ends of the hollow portion 14. As shown in FIGS. 8 and 9, each of the end walls 80 is provided with a projecting tip 80a which is inserted between a respective one of the longitudinally opposite ends of the lens array 3 and the transparent plate 2, forcing the lens array 3 downwardly at its longitudinally opposite ends. As a result, the lens array 3 is reliably fixed. Further, each of the light reflective surfaces 81a which is the side surface of a respective projecting tip 80a is oriented into the hollow portion 14 between the lens array 3 and the transparent plate 2.

Next, the operation of the image reading apparatus Aa will be described.

Light emitted from the LED chips 6 travels through the hollow portion 14 toward the image read line S. In traveling, the light diverges longitudinally of the hollow portion 14, as shown in FIGS. 7 through 9. At this time, the light traveling toward the longitudinally opposite ends of the hollow portion 14 is efficiently reflected at the light reflective surface 81, 81a. Part of the light thus reflected reaches the image read line S mostly at the longitudinally opposite ends of the image read line S. Particularly, since the light reflective surfaces 81a are positioned higher than the lens array 3 and adjacent to the longitudinally opposite ends of the image read line S, the light impinging on the light reflective surface 81a is efficiently reflected to the longitudinally opposite ends of the image read line S. Thus, the amount of light directed to the longitudinally opposite ends of the image read line S can be increased, thereby preventing the ends from being less illuminated than a longitudinally central portion of the image read line S. Thus, with the image reading apparatus Aa, it is possible to illuminate the image read line S uniformly, like the image reading apparatus A of the first embodiment, so that image reading quality can be enhanced. The image reading apparatus A of the first embodiment has the same advantage as those of the image reading apparatus Aa and realizes uniform illumination of the image read line, because the walls 17c, 17d defining the longitudinally opposite ends of the hollow portion 14 have light reflective surfaces.

The above-described advantages of the image reading apparatus Aa are obtained because the surfaces 80, 81a of the complementary member 8 are light-reflective. Accordingly, the same advantages can be obtained even if the case 1 is not white. Therefore, also in the image reading apparatus Aa, the case may be made of black resin for example. In the present invention, the light reflective surfaces may be provided directly on the case without separately providing the complementary member in the case. For example, white painting, or any other material or member having high light reflectivity may be applied to selected portions of the case to provide light reflective surfaces.

The specific structure of each of the components in the image reading apparatus in accordance with the present invention may be modified in various ways. For example, light sources other than the LED chips may be employed.

The invention claimed is:

1. An image reading apparatus comprising:
a substrate which has an obverse surface provided with a plurality of light sources arranged in a row;
a case including a hollow portion extending along the row of the light sources for guiding light emitted from the light sources toward an image read line; and
a lens array for forming an image of a document onto a plurality of light receiving elements arranged in a row, the document being disposed to face the image read line;
wherein the image reading apparatus includes a pair of wall surfaces defining longitudinally opposite ends of the hollow portion, at least part of each wall surface being a light-reflective surface;
the image reading apparatus further comprising a complementary member which is separate from the case but is mounted in the case, the complementary member having outer surfaces which are at least partially white, part of the complementary member serving as the light reflective surface.

2. The image reading apparatus according to claim 1, wherein the light reflective surface is white.

3. The image reading apparatus according to claim 1, wherein the hollow portion provides a space between the image read line and the lens array, the light reflective surface being oriented into the space.

4. The image reading apparatus according to claim 1, wherein the case includes a groove for receiving the lens array, part of the complementary member being disposed between the lens array and the image read line to prevent the lens array from coming out of the groove.

5. An image reading apparatus comprising:
a substrate which has an obverse surface provided with a plurality of light sources arranged in a row;
a case including a hollow portion extending along the row of the light sources for guiding light emitted from the light sources toward an image read line; and
a lens array for forming an image of a document onto a plurality of light receiving elements arranged in a row, the document being disposed to face the image read line;
wherein the image reading apparatus includes a pair of wall surfaces defining longitudinally opposite ends of the hollow portion, at least part of each wall surface being a light-reflective surface;
wherein the case includes a groove for receiving the lens array, the case being provided with a transparent plate which has an obverse surface providing the image read line; and
wherein the transparent plate has a reverse surface formed with a projection for engagement with the lens array for forcing the lens array toward a bottom of the groove.

* * * * *